E. Lindner & C. Hoffmann.
Pocket-Book.
Nº 14,246.   Patented Feb. 12, 1856.
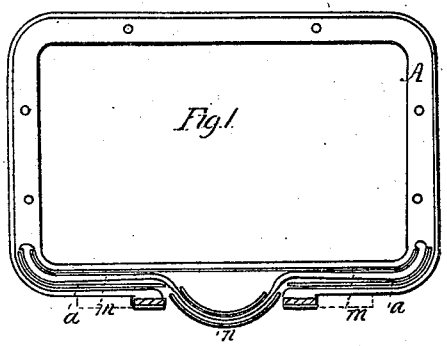
Fig. 1.
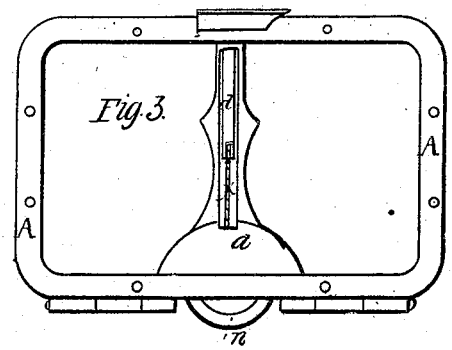
Fig. 3.
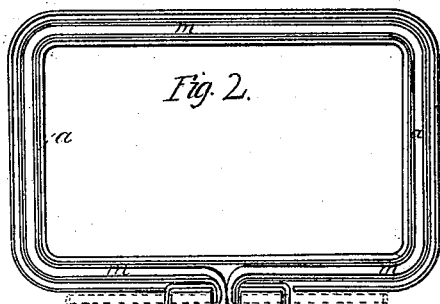
Fig. 2.
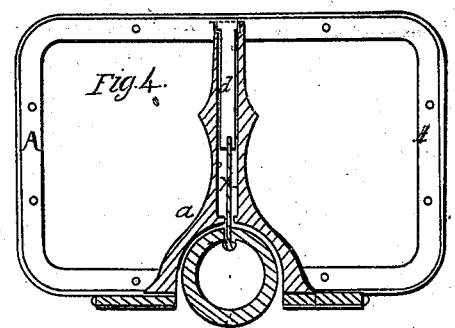
Fig. 4.
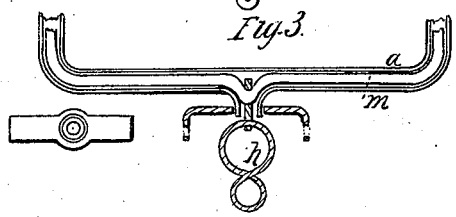
Fig. 3.
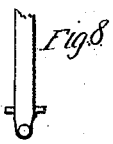
Fig. 8.
Fig. 11.
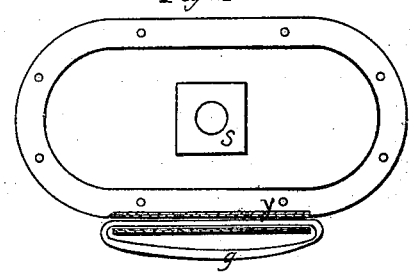
Fig. 11.
Fig. 10.
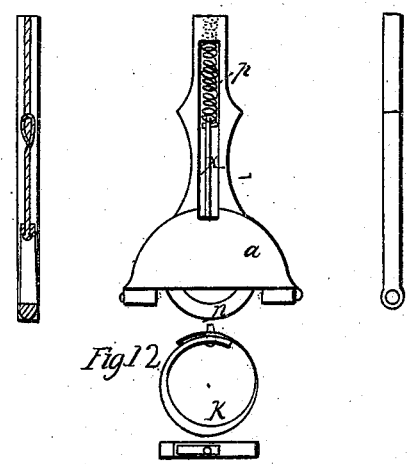
Fig. 12.

UNITED STATES PATENT OFFICE.

EDWARD LINDNER AND CONRAD HOFFMANN, OF NEW YORK, N. Y.

PORTE-MONNAIE.

Specification of Letters Patent No. 14,246, dated February 12, 1856.

*To all whom it may concern:*

Be it known that we, EDWARD LINDNER and CONRAD HOFFMANN, both of the city of New York, in the county and State of New York, have invented a new Improvement in Porte-Monnaies; and we do hereby declare that the following is a full and exact description thereof.

The nature of our invention consists in attaching to porte-monnaies, rings or hooks in connection with springs, bands or india rubber cords for the purpose of fastening the article to the finger to prevent in some measure losing the article.

The figures in the accompanying drawings represent different arrangements of the manner of constructing the articles.

Figure I, A represents the porte-monnaie frame having two small tubes (*a*) fastened in the inside at the bottom of the frame, containing an india rubber cord (*m*). The center part of said cord is covered by a casing (*n*) made of any suitable material, and forming part of a circle, by which the porte-monnaie is attached to the finger, and held tight through the elasticity of the india rubber cord.

Fig. II, A represents the porte-monnaie frame or the frame of a porte-monnaie having a tube (*a*) running all around the frame which is either attached to the same or to any of the inner partitions. An india rubber cord (*m*) is passed through this tube the ends of which are tied together, passing through an opening left in the hinge, and forming a loop, for attaching the article to the finger. A spring ring (*k*) as represented in Fig. III, or a spring catch (*h*) as represented in Fig. VII may be attached to the ends of said india rubber cord or to the loop. Instead of this hollow tube (*a*) attached to the frame, one side of the frame may be made hollow and the india rubber cord passed through the same.

Fig. III is an outside view and Fig. IV is a section of a porte-monnaie in which A represents the frame provided with a suitable casing (*a*) attached to the hinge, and fastened on the inside either to one of the frames or to one of the partitions. This casing contains an india rubber cord (*d*), one end of which is attached to said casing, and the other end is connected through a small wire (*x*) to a finger ring (*n*) which lies likewise partly in said casing and projects at the outside of the porte-monnaie sufficiently far out, to be able to take hold of. Instead of this india rubber cord (*d*) as here represented a small spiral spring (*p*) may be substituted as represented in Fig. XI.

Fig. IX represents a porte-monnaie made with a hollow hinge (*y*) through which an india rubber cord (*z*) is passed, tied together so as to form a convenient loop to attach the porte-monnaie to the hand, or a provision (*s*) may be attached to the side covering to fasten a spring ring (Z) Fig. X to the same.

What we claim as our invention and desire to secure by Letters Patent is—

The application and manner of connecting to the inside of porte-monnaies elastic bands, or india rubber cords, or springs passing through the joint to the outside, so as to be able to attach the same to the finger substantially as described.

EDWARD LINDNER.
CONRAD HOFFMANN.

Signed in presence of—
HENRY E. RAEDER,
JAMES T. KING.